Jan. 13, 1931. J. H. KLIEGL 1,789,103
THEATER LIGHT
Filed April 13, 1928 2 Sheets-Sheet 1

Inventor
JOHN H. KLIEGL
By his Attorneys
Cooper, Kerr & Dunham.

Jan. 13, 1931. J. H. KLIEGL 1,789,103
THEATER LIGHT
Filed April 13, 1928 2 Sheets-Sheet 2

Inventor
JOHN H. KLIEGL
By his Attorneys
Cooper, Kerr & Dunham

Patented Jan. 13, 1931

1,789,103

UNITED STATES PATENT OFFICE

JOHN H. KLIEGL, OF NEW YORK, N. Y., ASSIGNOR TO KLIEGL BROS. UNIVERSAL ELECTRIC STAGE LIGHTING CO., INC., OF NEW YORK, N. Y., A CORPORATION OF NEW YORK

THEATER LIGHT

Application filed April 13, 1928. Serial No. 269,666.

This invention pertains to lights such as border lights used in theaters for providing illumination for the stage. Such lights are usually supplied with color mediums in the form of circular glass lenses adapted to be easily removed and replaced by lenses of different color. A theater usually has on hand a supply of lenses of standard colors such as clear, red, blue, etc., and can therefore readily provide illumination in any of those colors. Occasionally, however, a theater is required, often on short notice, to supply stage illumination of colors different from what they have on hand. Under such conditions there is no time to procure glass lenses of proper color, nor would it be practical to do so even if time were sufficient, on account of the prohibitive expense of buying equipment for only temporary use.

To meet such circumstances I provide the light structure, with devices adapted to support a plain glass or gelatin medium in place of the regular lens, thereby affording the theater a ready, inexpensive, and acceptable means of tiding over an emergency, because plain-colored glass or gelatin mediums are readily obtainable at moderate cost and may be readily cut to size and shape suitable for use in my device.

Further and other objects and advantages will be hereinafter set forth in the accompanying specification and claim, and shown in the drawings, which by way of illustration show what is now considered to be the preferred embodiment of the invention.

Figure 1:
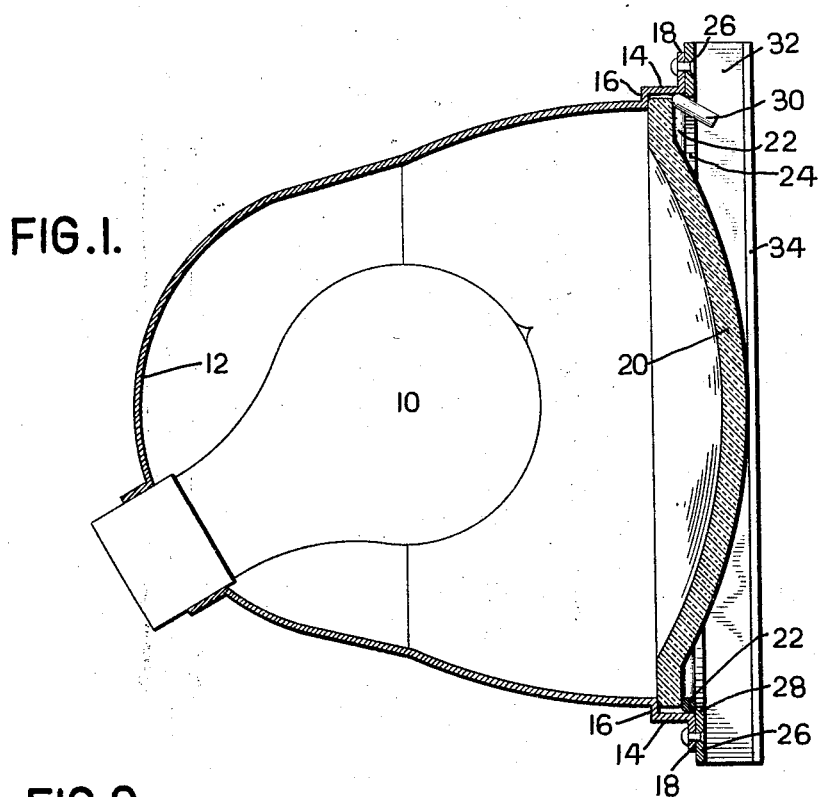
Fig. 1 is a cross-section of the complete light with standard equipment, with my improvement added.
Figure 2:
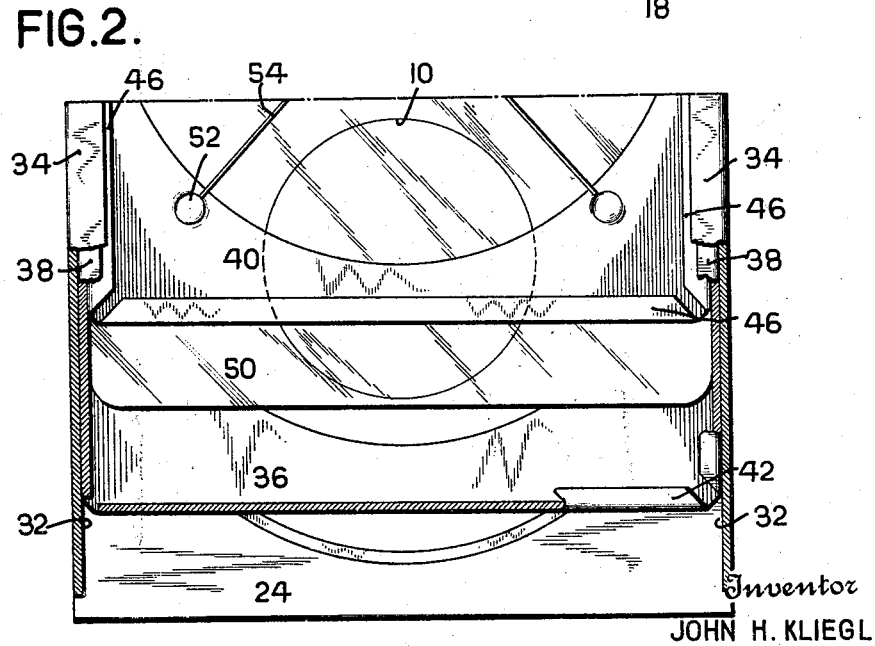
Fig. 2 is a fragmentary view of the lower portion of Fig. 3, with glass retaining slides in displaced position.

Referring to Fig. 1, 10 is a lamp bulb held in position in a reflector 12. The open end of the reflector is provided with a cylindrical recess 14 joined to the reflector in such manner as to provide a shoulder 16. A radial rim 18 extends radially outwardly from the face of the cylinder portion of the reflector. A colored glass medium in the form of a lens 20 is placed against shoulder 16 within cylindrical recess 14. Lens 20 is held in place by a resilient wire split ring 22 of familiar design, the ring being adapted to snap into position between lens 20 and a frame 24 which is secured to the front of flange 18 by rivets 26 or otherwise. The face of frame 24 adjacent flange 18 is provided with a circular opening of slightly less diameter than cylindrical recess 14, thereby forming a shoulder 28 which retains ring 22 in position while the ring is expanded, the ring, in turn, holding the lens in position. The split ring may be collapsed by pinching together its two projecting ends 30 whereupon the lens may be removed through the opening in flange 28.

The forwardly projecting portion of frame 24 is shaped to form two parallel channel guides 32 having front flanges 34. Arranged to enter channels 32 and be retained thereby is a slide 36 having its lateral edges 38 folded over to form guides for another slide 40 adapted to enter and be retained by edges 38. The lower edge of slide 36 is upturned as at 42 to serve as a stop for slide 40. The upper end of slide 36 has a rearwardly extending lip 44 to serve as a handle and to act as a supporting stop when the slides are in operative position. The edges of slide 40 are bent over as at 46 to stiffen the slide. Slides 36 and 40 are provided with circular openings of substantially the same diameter as the open end of the reflector.

Figure 4:
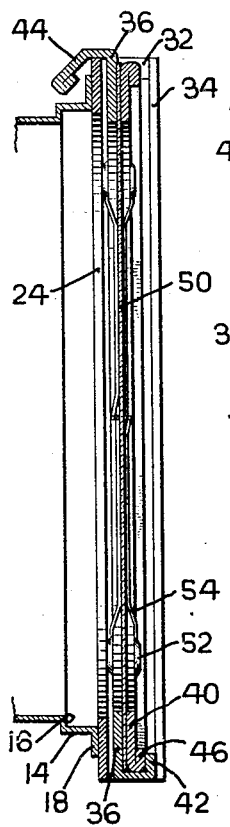
Fig. 4 is a section on the line 4—4 of Fig. 3.
Figure 3:
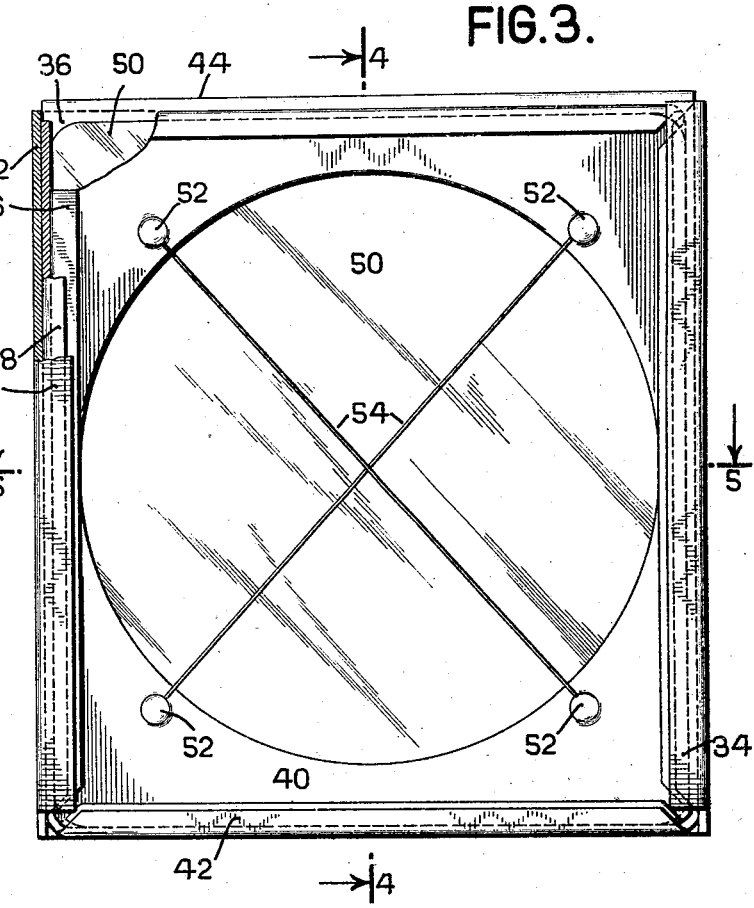
Fig. 3 is a front view of the glass retaining slides, partly broken away, with a sheet of glass or gelatin in position between them.
Figure 5:
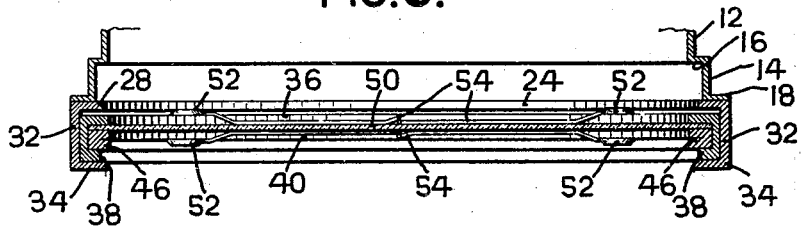
Fig. 5 is a section on the line 5—5 of Fig. 3.

Fig. 1 shows the light arranged for regular operation with colored lens 20 in position. For emergency service as above described, lens 20 and retaining ring 22 are removed, and a rectangular colored glass or gelatin medium 50 is placed between metal slides 36 and 40, which are then dropped into position in channels 32 as shown in Fig. 4.

Soldered as at 52 to slides 36 and 40 are cross wires 54 to aid in keeping the gelatin medium in proper position and prevent its warping.

It is to be understood that the invention is not limited to the construction herein specifically illustrated and described but can be embodied in other forms without departure from its spirit, as expressed by the claim.

I claim—

In a light of the kind described, in combination, a reflector having a circular recess at its open end, a circular color medium adapted to enter said recess, a frame attached to the open end of said reflector, a resilient split ring adapted to engage the inner side of said frame and the outer side of said circular medium to retain said medium in said recess, a rectangular color medium, and devices for supporting said rectangular medium in said frame for the purpose set forth.

In testimony whereof I hereto affix my signature.

JOHN H. KLIEGL.